(12) United States Patent
Roberts

(10) Patent No.: US 9,532,680 B2
(45) Date of Patent: Jan. 3, 2017

(54) ACCESSORIES FOR BARBEQUE GRILL

(71) Applicant: Charles Lawrence Roberts, Charlotte, NC (US)

(72) Inventor: Charles Lawrence Roberts, Charlotte, NC (US)

( * ) Notice: Subject to any disclaimer, the term of this patent is extended or adjusted under 35 U.S.C. 154(b) by 332 days.

(21) Appl. No.: 14/082,465

(22) Filed: Nov. 18, 2013

(65) Prior Publication Data
US 2014/0137854 A1 May 22, 2014

Related U.S. Application Data

(60) Provisional application No. 61/727,857, filed on Nov. 19, 2012.

(51) Int. Cl.
A47J 37/07 (2006.01)

(52) U.S. Cl.
CPC .................................. A47J 37/0786 (2013.01)

(58) Field of Classification Search
CPC .................................................... A47J 37/0786
USPC ................. 126/25 R, 9 B, 163 R, 79; 99/481
See application file for complete search history.

(56) References Cited

U.S. PATENT DOCUMENTS 611,376 A * 9/1898 Craig ....................... F24C 15/10
126/215
4,190,677 A * 2/1980 Robins ................ A47J 37/0786
426/315
6,065,464 A * 5/2000 Zajec .................. A47J 37/0786
126/25 B
7,832,330 B1 * 11/2010 Thompson .......... A47J 37/0704
126/163 R

OTHER PUBLICATIONS

Big Green Egg; Big Green Egg World's Best SmokerandGrill! The Original American Designed Ceramic Cooker; pp. 1-16; www.biggreenegg.com.
Big Green Egg; Big Green Egg The Ultimate Cooking Experience, Home Cooking Tools; pp. 1-6, Big Green Egg, EGGzilla.
Big Green Egg; Big Green Egg The Ultimate Cooking Experience, Home Specialty Cookware; pp. 1-4, Big Green Egg, EGGzilla.
Big Green Egg; Big Green Egg The Ultimate Cooking Experience, Plate Setters; Aug. 30, 2013; p. 1; mhtml:file://C:\Users\Owner\Pictures\BGE 2.mht.
Big Green Egg; Big Green Egg The Ultimate Cooking Experience, Specialty Cookware; Feb. 11, 2014; pp. 1-3; mhtml:file://C:\Users\Owner\Pictures\BGE 4.mht.

* cited by examiner

Primary Examiner — Avinash Savani
(74) Attorney, Agent, or Firm — Shumaker, Loop & Kendrick, LLP

(57) ABSTRACT

A barbeque accessory assembly for use with a barbeque grill having an enclosure within which is contained a fire ring positioned over a fire box, with a grill grate positioned in vertically spaced relation above the fire ring. The accessory assembly includes a component bar receiving bracket positioned above the fire box and a pair of arms for supporting a bracket body on the fire box. The bracket body also includes a notch for receiving and supporting one end of a component bar thereon. The bracket body including a slot for receiving an accessory therein.

9 Claims, 12 Drawing Sheets

ACCESSORIES FOR BARBEQUE GRILL

CROSS-REFERENCE TO RELATED APPLICATION

This application claims priority to U.S. Provisional Application No. 61/727,857 filed Nov. 19, 2012, the contents of which are incorporated by reference herein.

TECHNICAL FIELD AND BACKGROUND OF THE INVENTION

This application relates to accessories for use with barbeque grills. In particular, the disclosure of this application relates specifically to accessories designed for use with a kamado-type grill product. The most well-known and popular such grill is marketed under the trademark Big Green Egg. Such grills include a generally egg-shaped outer shell within which are contained various components intended to permit various types of food to be cooked in various ways. This invention provides several interior components that are designed to provide maximum utility of the grill for differing cooking methods while maintaining and maximizing the interior capacity of the grill in a manner not presently available.

BRIEF DESCRIPTION OF THE DRAWINGS

The invention will be more fully understood when taken in connection with the following drawings.

DETAILED DESCRIPTION OF THE PREFERRED EMBODIMENT

Figure 1:
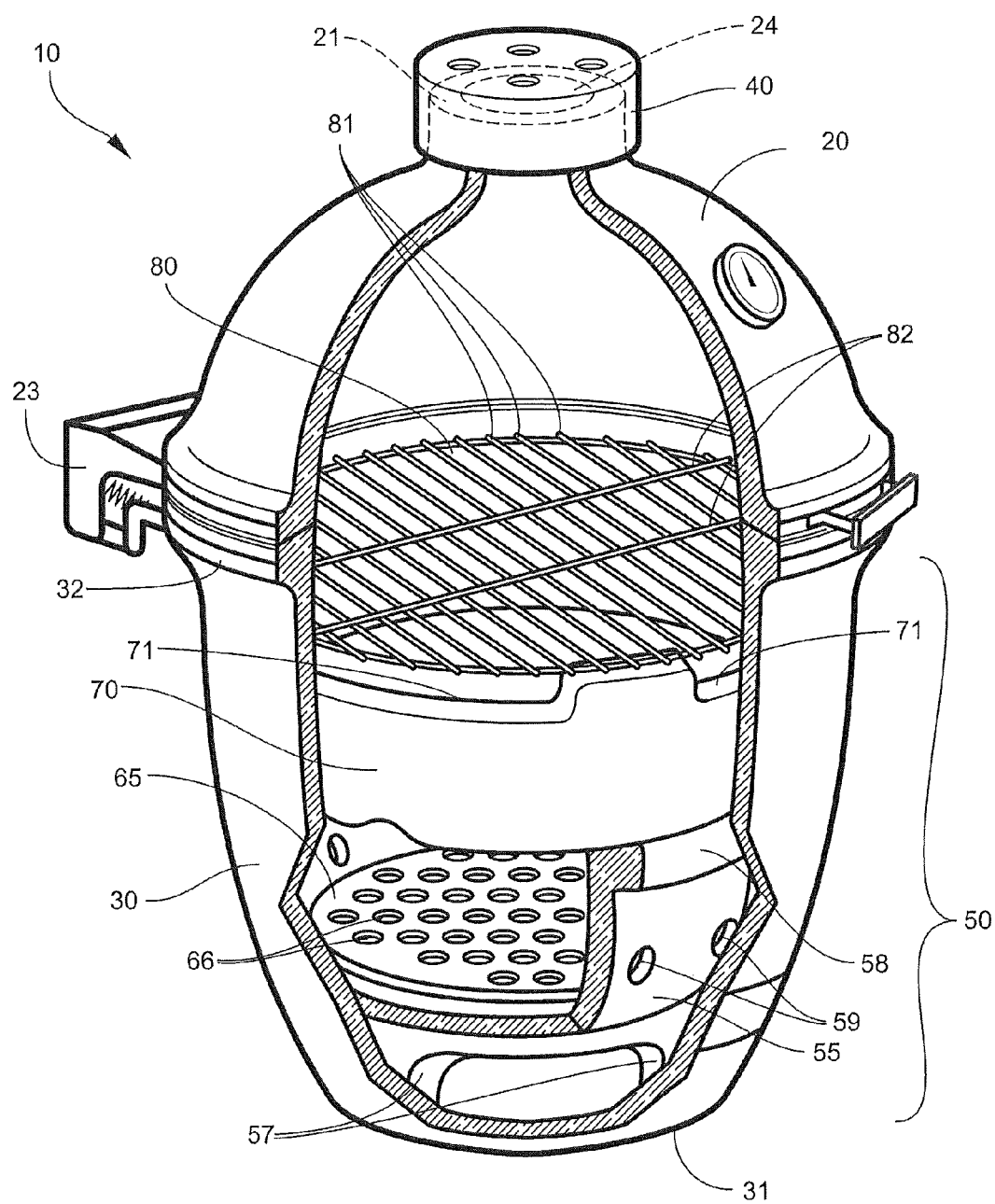
FIG. 1 is an exploded view of one embodiment of a grill with which the invention is used.

Referring now to FIG. 1, a kamado-type barbeque grill 10 of one type with which the accessories according to the invention can be used is described. Grill 10 includes a lid 20, a base 30, a damper top 40, and a fuel assembly 50.

Lid 20 includes a chimney 21, a bottom edge 22, and a handle 23. Lid 20 is substantially dome shaped. Chimney 21 protrudes outwardly from the top of lid 20 and defines a cylindrical opening 24. Opening 24 communicates with the interior of lid 20.

Base 30 is an inverted dome-shaped structure including a flat bottom 31 and an annular upper edge 32.

Damper top 40 is releasably connectable with chimney 21 and aligns with opening 24. When connected to chimney 21, damper top 40 is used to regulate the upward flow of heated air, and/or smoke through opening 24 of chimney 21. In a closed position, damper top 40 can completely or substantially prevent the flow of heated air, and/or smoke outwardly from the interior of lid 20.

Fuel assembly 50 includes a fire box 55, a fire grate 65, a fire ring 70, and a grill grate 80. When assembled, the fuel assembly 50 fits inside the base 30 and is covered by lid 20. Fire box 55 includes a bowl 56, supports 57, and a flange 58. Bowl 56 has several openings 59 in its side walls to allow for the flow of air into and out of fire box 55.

Fire grate 65 is substantially disc-shaped and has a plurality of perforations 66. Fire grate 65 provides a durable surface for igniting and burning heating fuel such as, for example, charcoal and wood. Perforations 66 allow air to flow through grate 65 in order to support combustion of the fuel.

Fire ring 70 sits on top of the flange 58 of the fire box 55 and provides the proper amount of spacing between the fuel and the food being cooked. The upper edge of fire ring 70 may include several recesses 71.

The grill grate 80 is a substantially circular structure formed of parallel bars 81 held in position by perpendicular cross bars 82, with an outer diameter that permits it to rest on the top edge of fire ring 70.

Figure 2:
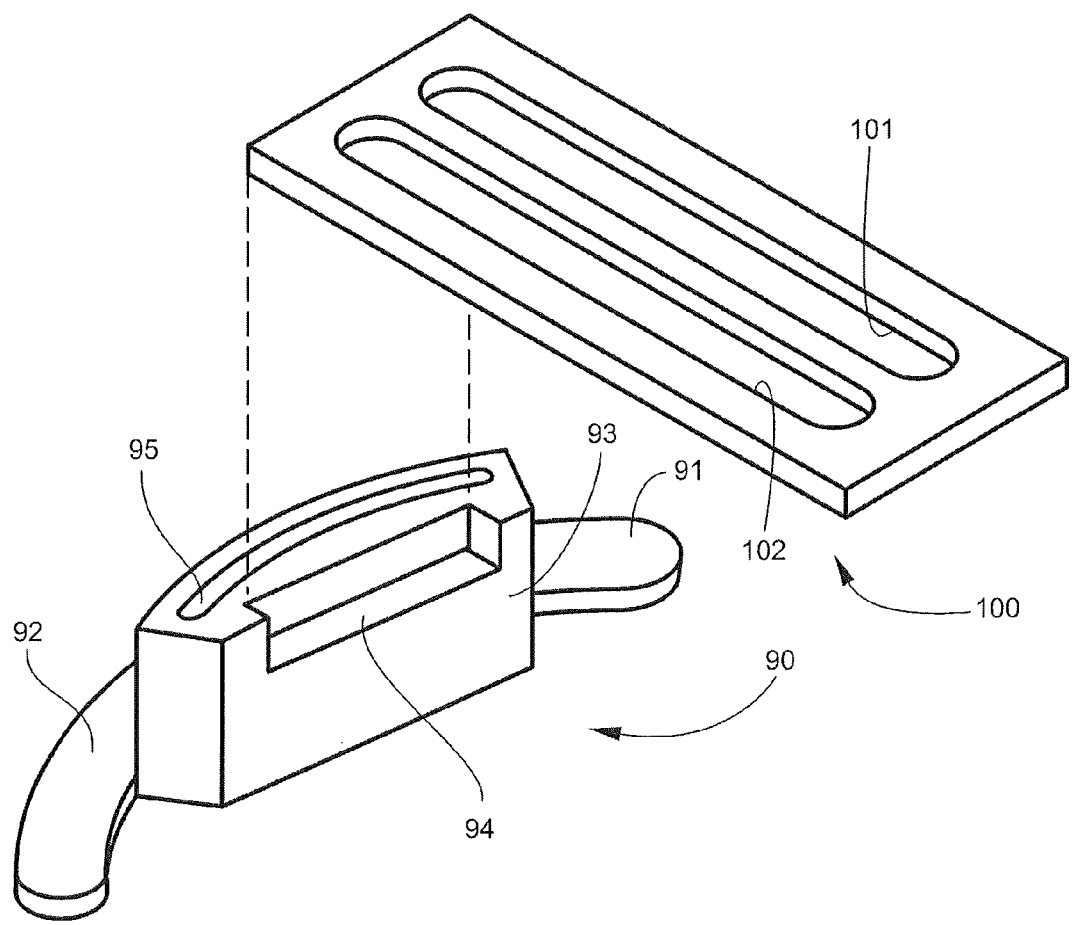
FIG. 2 is an exploded view of the component bar and component bar receiving bracket according to one embodiment of the invention.
Figure 3:
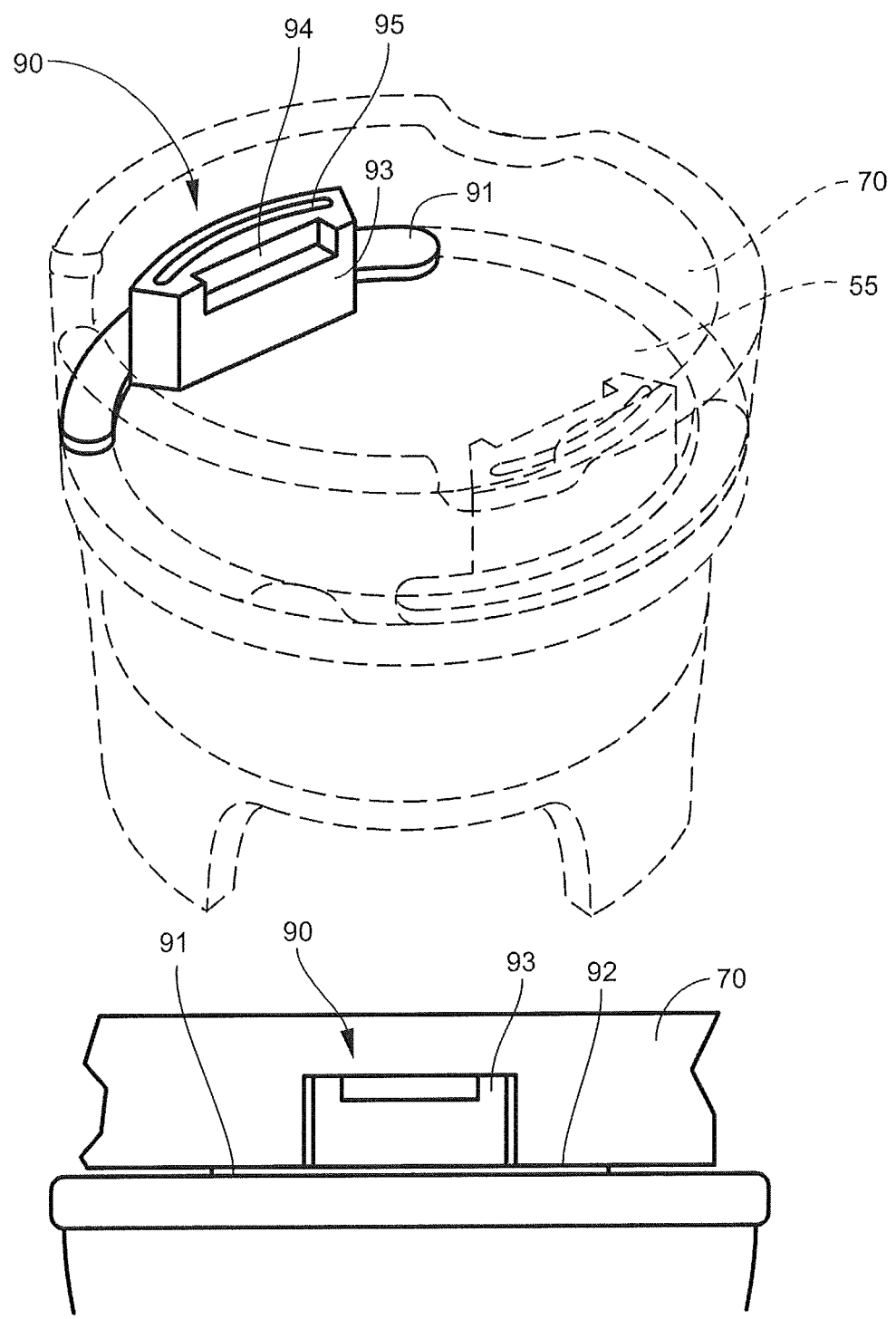
FIG. 3 shows two views of the placement of the component bar receiving bracket between the fire ring and the firebox.

Referring now to FIGS. 2 and 3, principal components of the novel interior assembly include a component bar receiving bracket 90, of which two are required, and a component bar 100, each fabricated from suitable steel or iron material. Each bracket 90 includes a pair of outwardly-extending curved arms 91, 92 attached to a curved central body 93 in which is formed a transversely-extending notch 94 and a curved slot 95.

The component bar 100 is elongate and includes two parallel slots 101 and 102. As shown in FIG. 2, one end of the component bar 100 is shaped and sized to fit into the notch 94 of the bracket 90.

Two brackets 90 are positioned with their respective arms 91, 92 resting on the top edge of the fire box 55 and held in position by the weight of the fire ring 70 which sits on top of the arms 91, 92. The two brackets 90 are positioned opposite each other on the fire box 55 in the manner described immediately above. The component bar 100 is positioned with opposite end edges fitted into the notches 94 and therefore bisects the interior annular space of the base 30. Note also in FIG. 3 that the body 93 of the bracket 90 extends radially-inwardly into the volume of the base 30.

The component bar 100 is thus used to support various attachments that are provided with flanges that fit into the slots 101, 102, as described below.

Figures 4, 5:
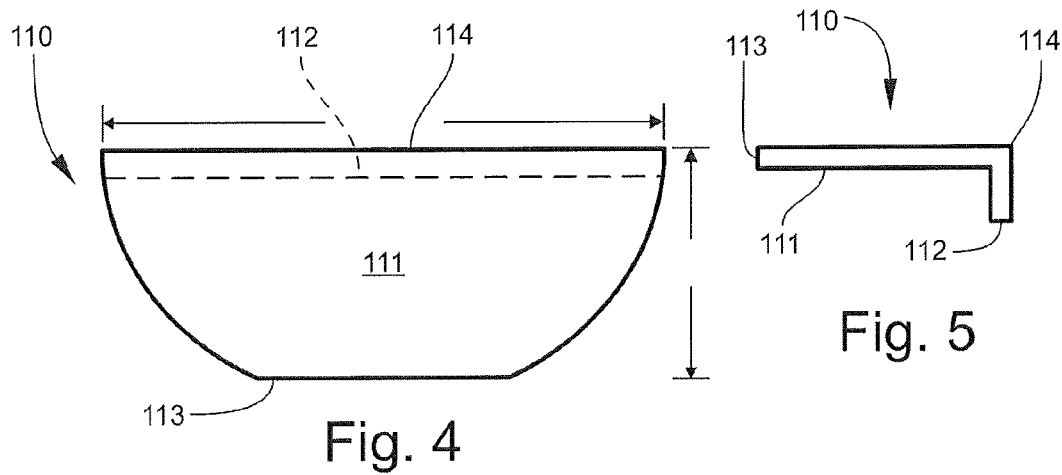
FIG. 4 is a top view of the firewall deflector plate according to one embodiment of the invention.
FIG. 5 is a side view of the firewall deflector plate according to one embodiment of the invention.

FIG. 4 illustrates a firewall deflector plate 110 that includes a solid steel or iron heat deflector 111 and a support flange 112 that, in one configuration, is inserted into one of the slots 101 or 102 in the component bar 100. Note that the firewall deflector plate 110 has a bottom edge 113 and a top edge 114 that are parallel to each other.

FIG. 5 is a side view of the firewall deflector plate 110 showing deflector 111 and the support flange 112.

Figures 6, 7:
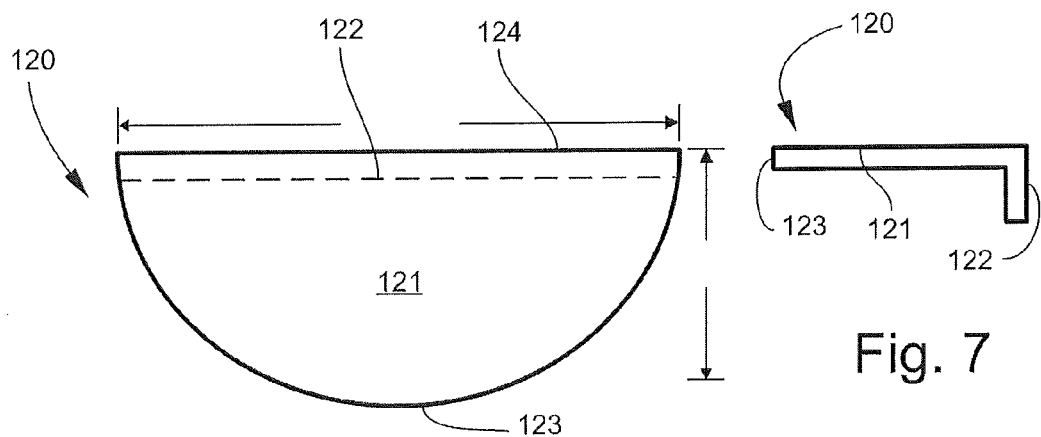
FIG. 6 is a top view of a deflector plate according to one embodiment of the invention.
FIG. 7 is a side view of the deflector plate shown in FIG. 6 according to one embodiment of the invention.

FIG. 6 illustrates a deflector plate 120 that includes a solid steel or iron heat deflector 121 and a support flange 122 that, in one configuration, is inserted into one of the slots 101 or 102 in the component bar 100. Note that the deflector plate 120 has a bottom edge 113 that is arcuate, whereas the top edge 114 is straight.

FIG. 7 is a side view of the deflector plate 120 showing deflector 121 and the support flange 122.

Figure 8:
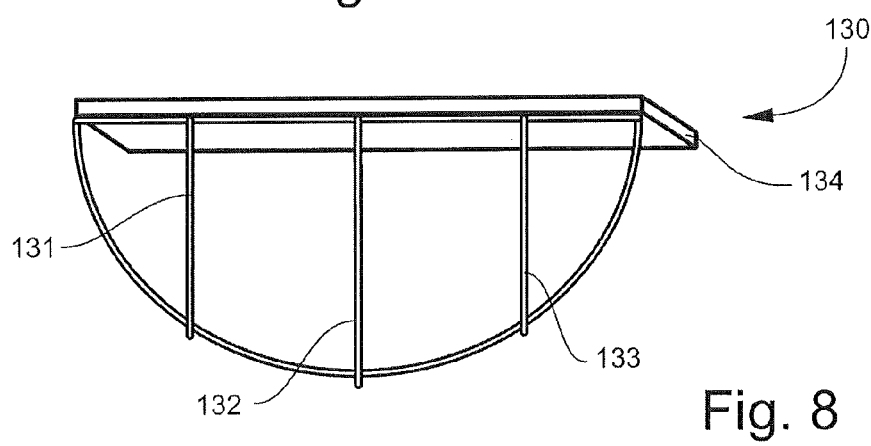
FIG. 8 is a top view of a drip pan rack according to one embodiment of the invention.

FIG. 8 shows a drip pan rack 130 formed of iron or steel bars 131-133 varied in length and captured between a support flange 134 and an arcuate bar 135.

Figure 9:
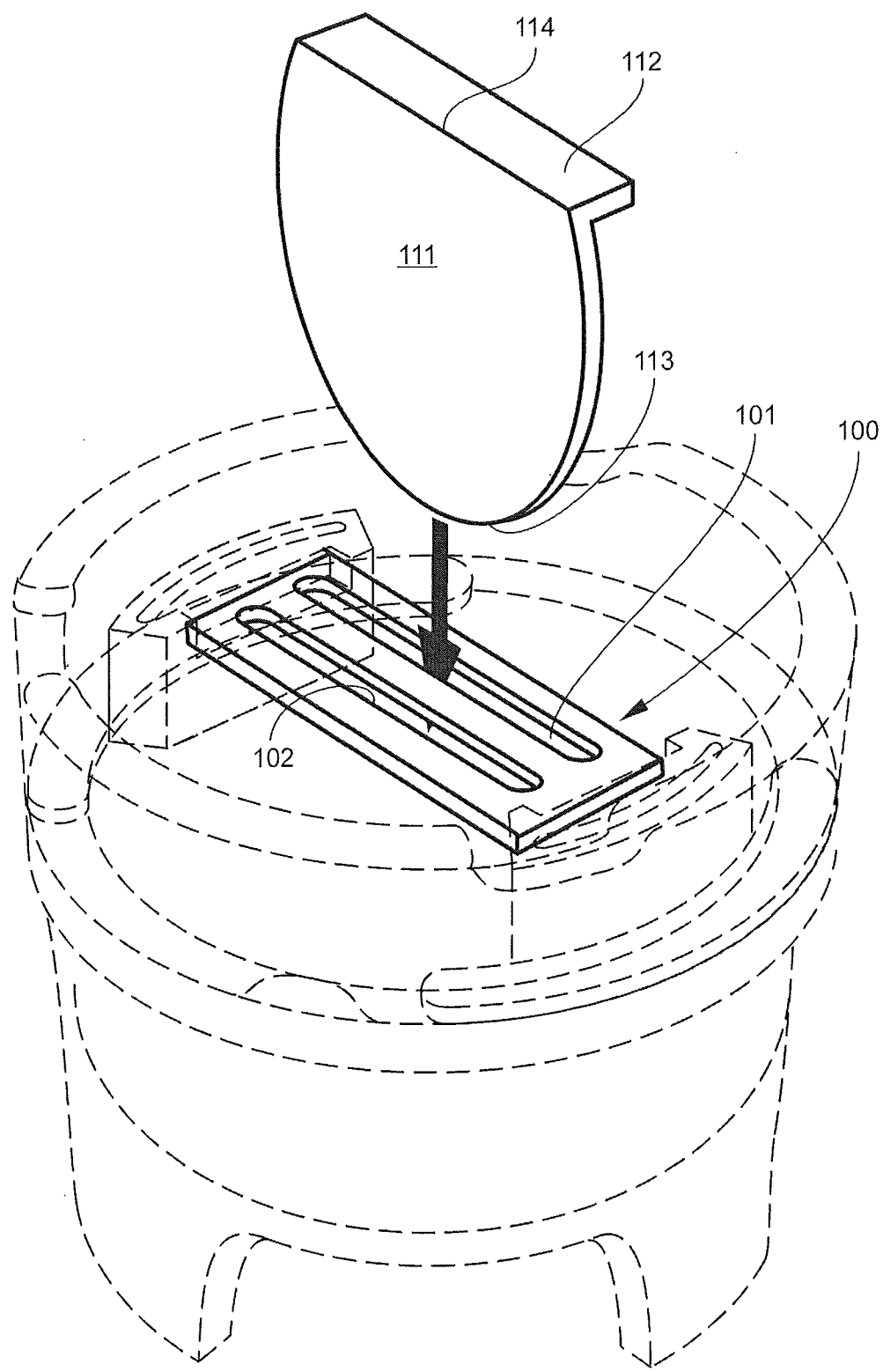
FIGS. 9 and 10 are perspective views of the firewall deflector plate and component bar in a drip pan rack configuration.
Figure 10:
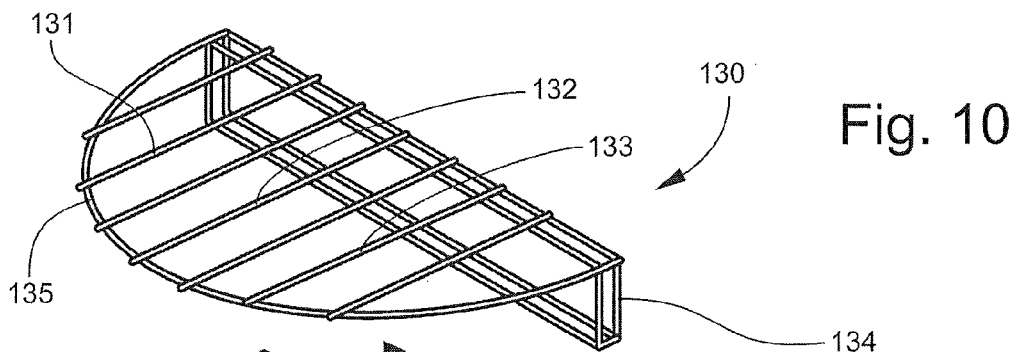

Use of the structures shown in FIGS. 2-8 is illustrated in FIGS. 9-12. In FIG. 9, the firewall deflector plate 110 is shown, with the deflector 111 inserted into slot 101 of the component bar 100 and supported in a vertical, depending position by the support flange 112. The deflector 111 has the effect of dividing the fire box 55 in half. If indirect cooking is desired, the fuel can be placed on one side of the deflector 111 and the food placed on the half of the grill grate 80 positioned over the other side of the deflector 111. As shown in FIG. 10, if use of a drip pan is desired, the support flange 134 of the drip pan rack 130 can be placed in the slot 102 of the component bar 100 so that the support bars 131-133 extend horizontally outwardly. A drip pan can be placed on the drip pan rack 130 to collect drippings from the food being cooked above on the grill grate 80.

Figure 11:
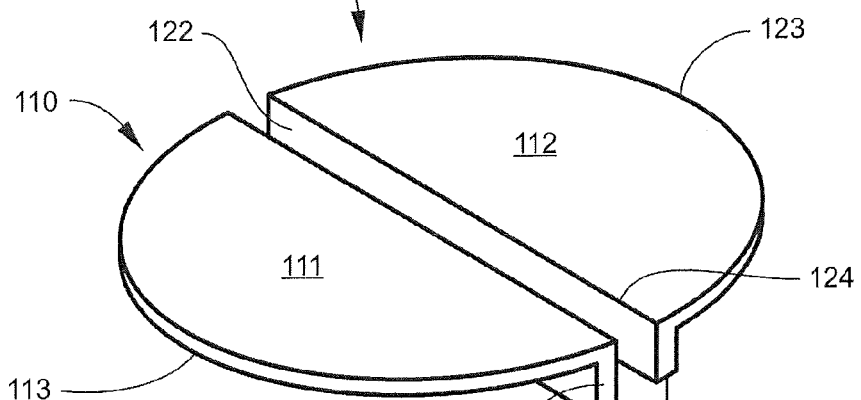
FIG. 11 is a perspective view showing the firewall deflector plate and component bar in a full deflection configuration.
Figure 12:
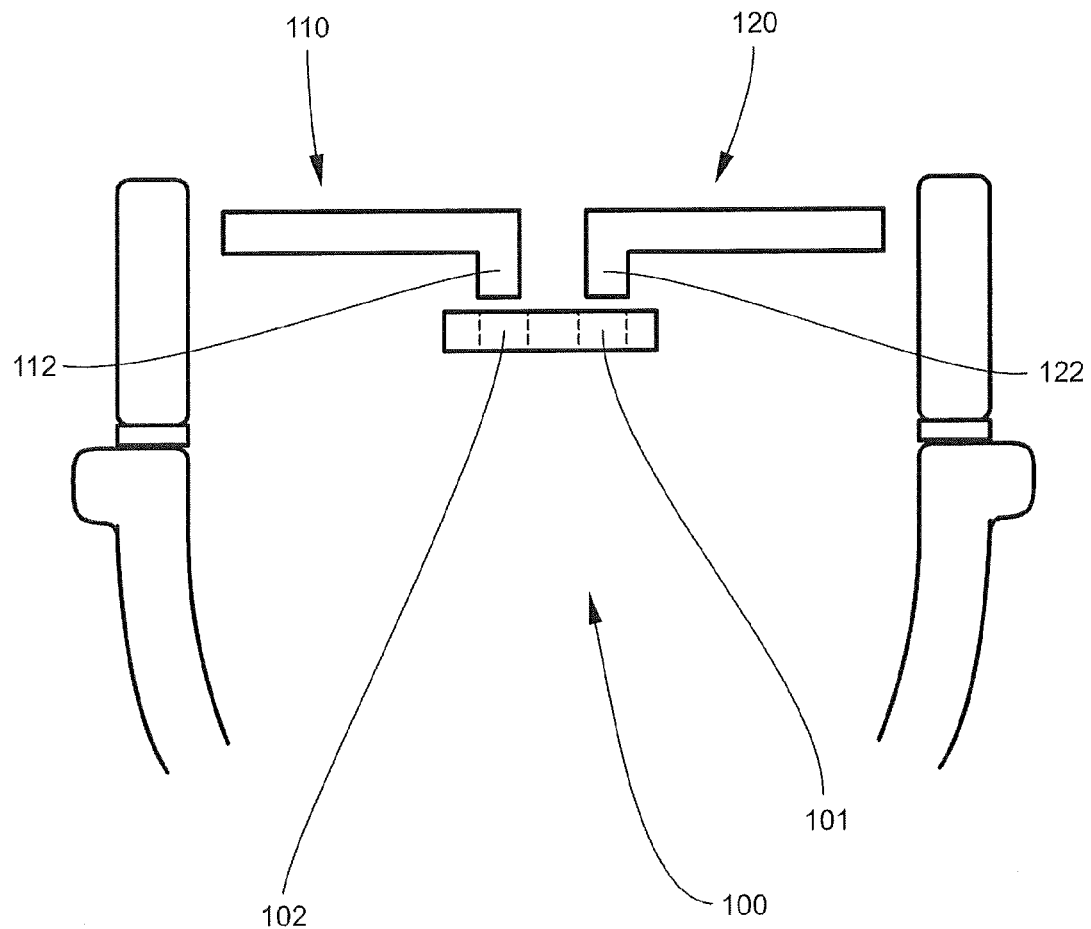
FIG. 12 is a side elevation showing placement of the deflector plates in the component bar in the full deflection configuration.

Referring now to FIGS. 11 and 12, if full indirect cooking is desired, the two deflector plates 110 and 120 are positioned with the respective support flanges 114 and 124 in the slots 102 and 101 of the component bar 100. Both deflector plates 110, 120 extend horizontally outward and cover the fire box 55, allowing heat from the fire box 55 to flow upwardly only through a gap around the edge of the base 30 formed by the peripheral edges of the deflector plates 110, 120 and the inner surface of the base 30.

Figure 13:
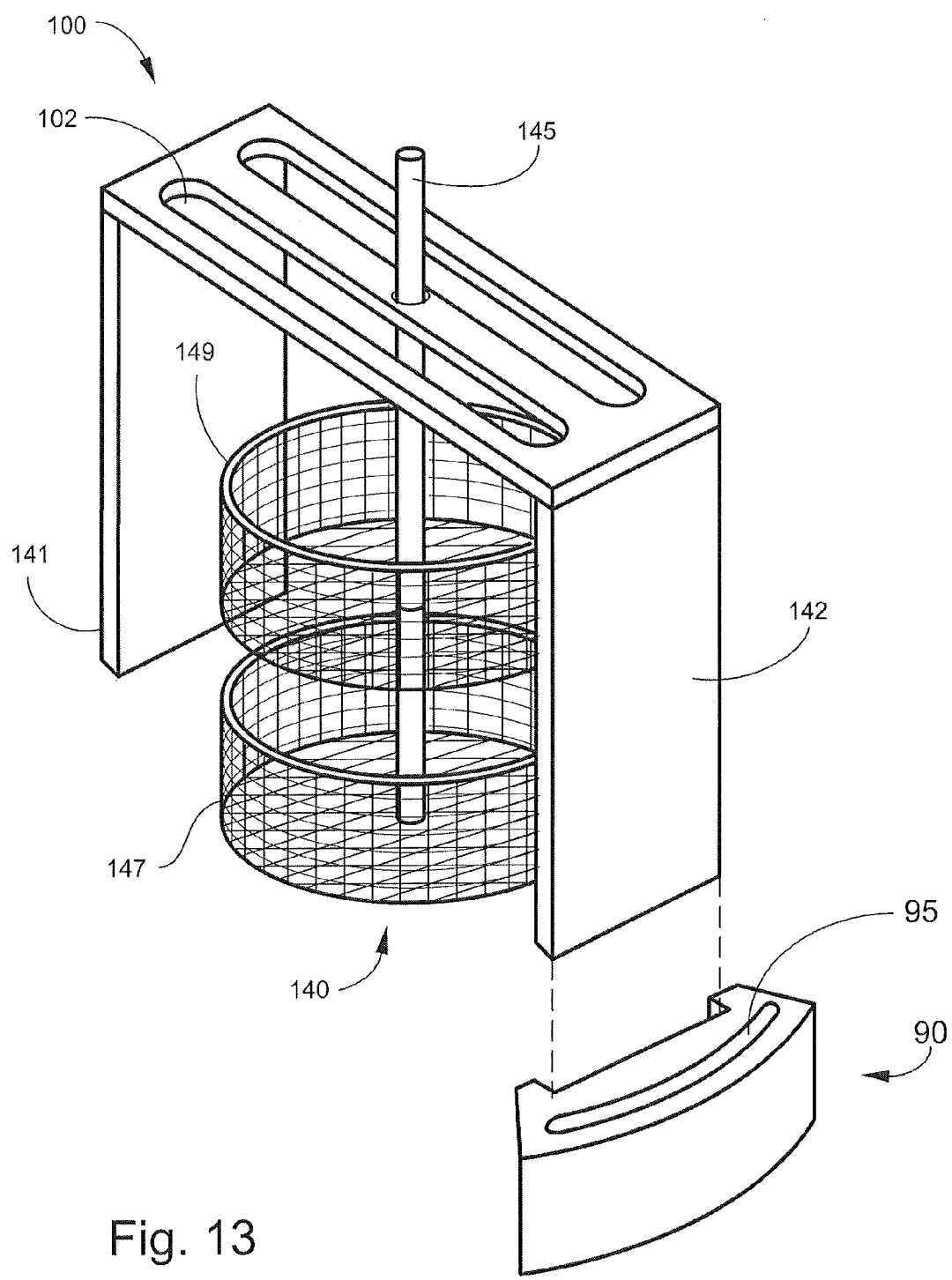
FIG. 13 is a perspective view of a roasting tower attachment for cooking food items.

Referring now to FIG. 13, a roasting tower assembly 140 is illustrated, and includes a pair of tower panels 141, 142 that are mounted to the component bar 100 and fit into the respective notches 94 in the two component bar receiving brackets 90. A support rod 145 is suspended through one of the slots 101, 102 in the component bar. A nut or other enlargement on the support rod 145 maintains the support rod 145 at the desired vertical position. As shown, two roasting baskets 147, 149 are mounted on the support rod 145 within the area formed by the height of the tower panels 141, 142. Any suitable number of baskets may be used, and if two or more are used, may be stacked on each other or vertically spaced-apart for better air flow. Also, a hole or enlargement of either or both slots 101, 102 may be formed in the component bar 100 to receive the support rod 145, and the tower panels 141, 142 may be formed with a curved profile permitting them to be placed in the slots 95 of the component bar receiving brackets 90.

Figure 14:
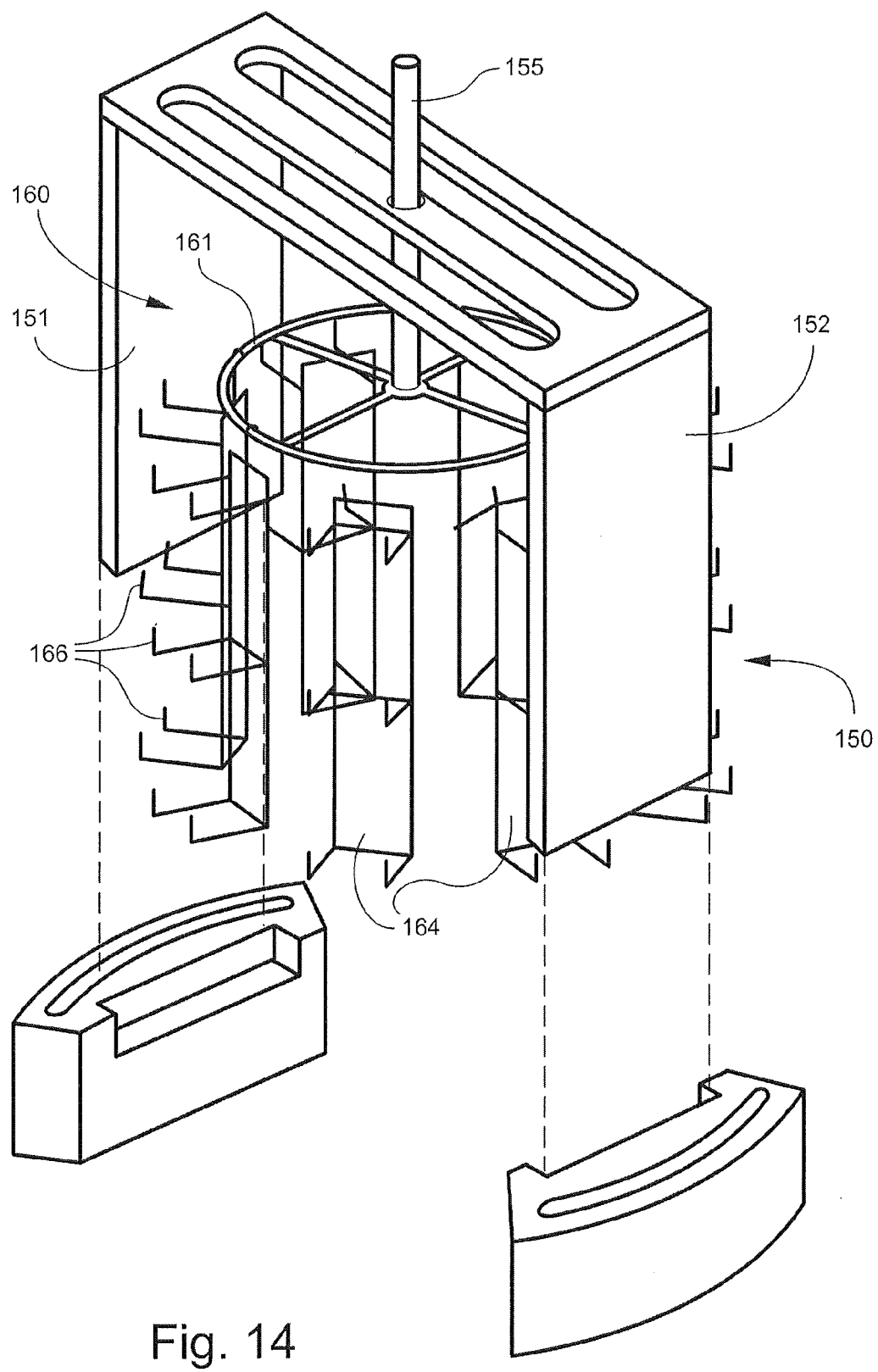
FIG. 14 is a perspective view of a rib tower arrangement for ribs in a vertical orientation.

Referring now to FIG. 14, a rib tower assembly 150 is illustrated, and includes a pair of curved tower panels 151, 152 the bottom ends of which are mounted to the component bar 100 and fit into the respective slots 95 in the two component bar receiving brackets 90. The top ends of the tower panels 151, 152 support the component bar 100. A support rod 155 is suspended through one of the slots 101, 102 in the component bar 100. A nut or other enlargement on the support rod 155 maintains the support rod 155 at the desired vertical position. Also, a hole or enlargement of either or both slots 101, 102 may be formed in the component bar 100 to receive the support rod 155.

The support rod 155 supports a rib rack carousel 160 constructed of suitable iron or steel bar stock and formed as a circle with a peripheral rim 161 on which may be suspended one or more rib racks 164. Each rib rack 164 includes hooks 166 on which may be fastened food items such as rib sections for cooking. Suspending the ribs vertically enhances cooking time and flavor by permitting the ribs to be basted during cooking as juices drain down the sides of the ribs.

Figure 15:
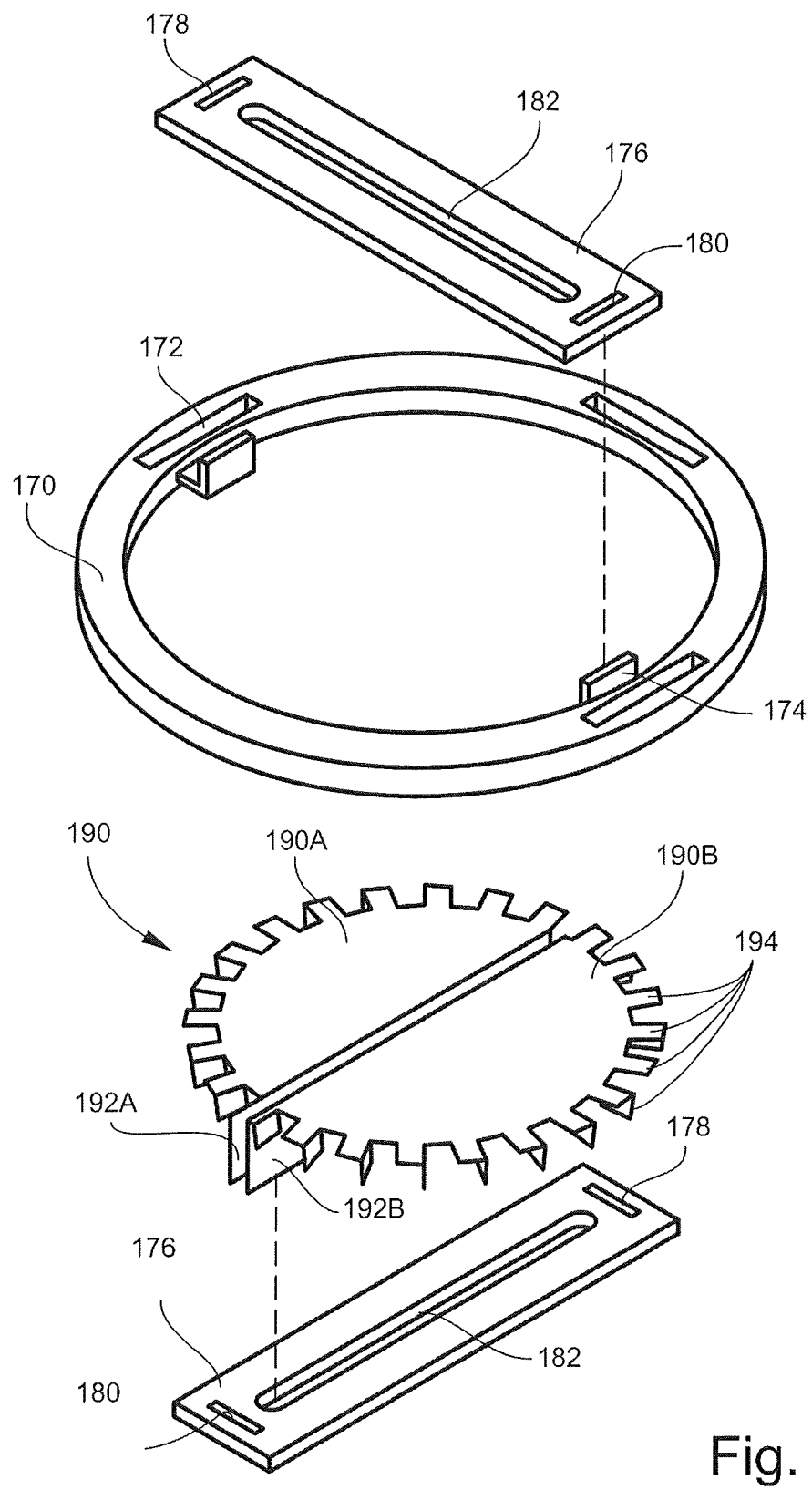
FIG. 15 is a composite view of an assembly base, deflector plate and component bars according to an embodiment of the invention.
Figure 16:
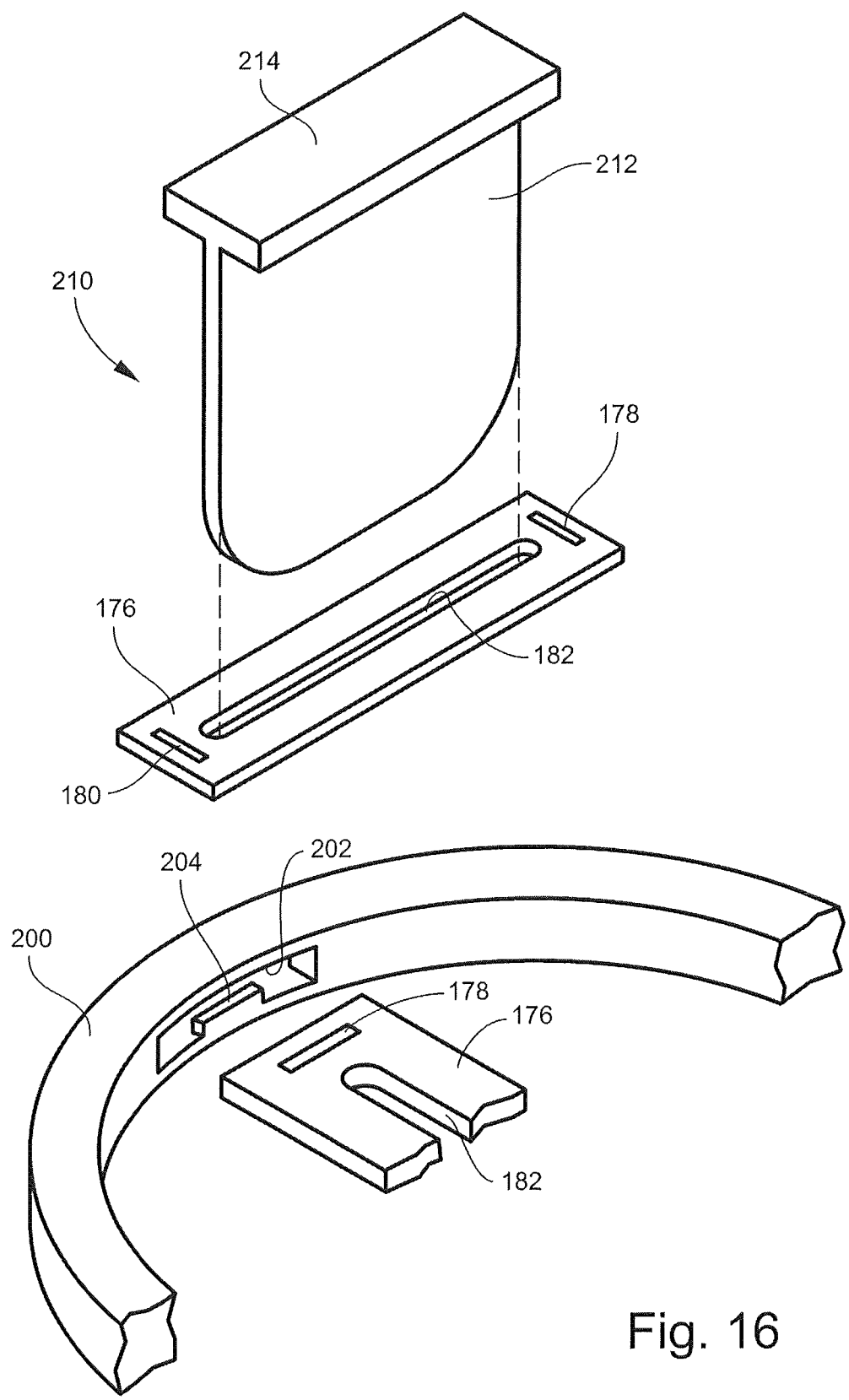
FIG. 16 is a perspective view of a divider plate that fits into the component bar and sits on the assembly base, shown in a fragmentary view.
Figure 17:
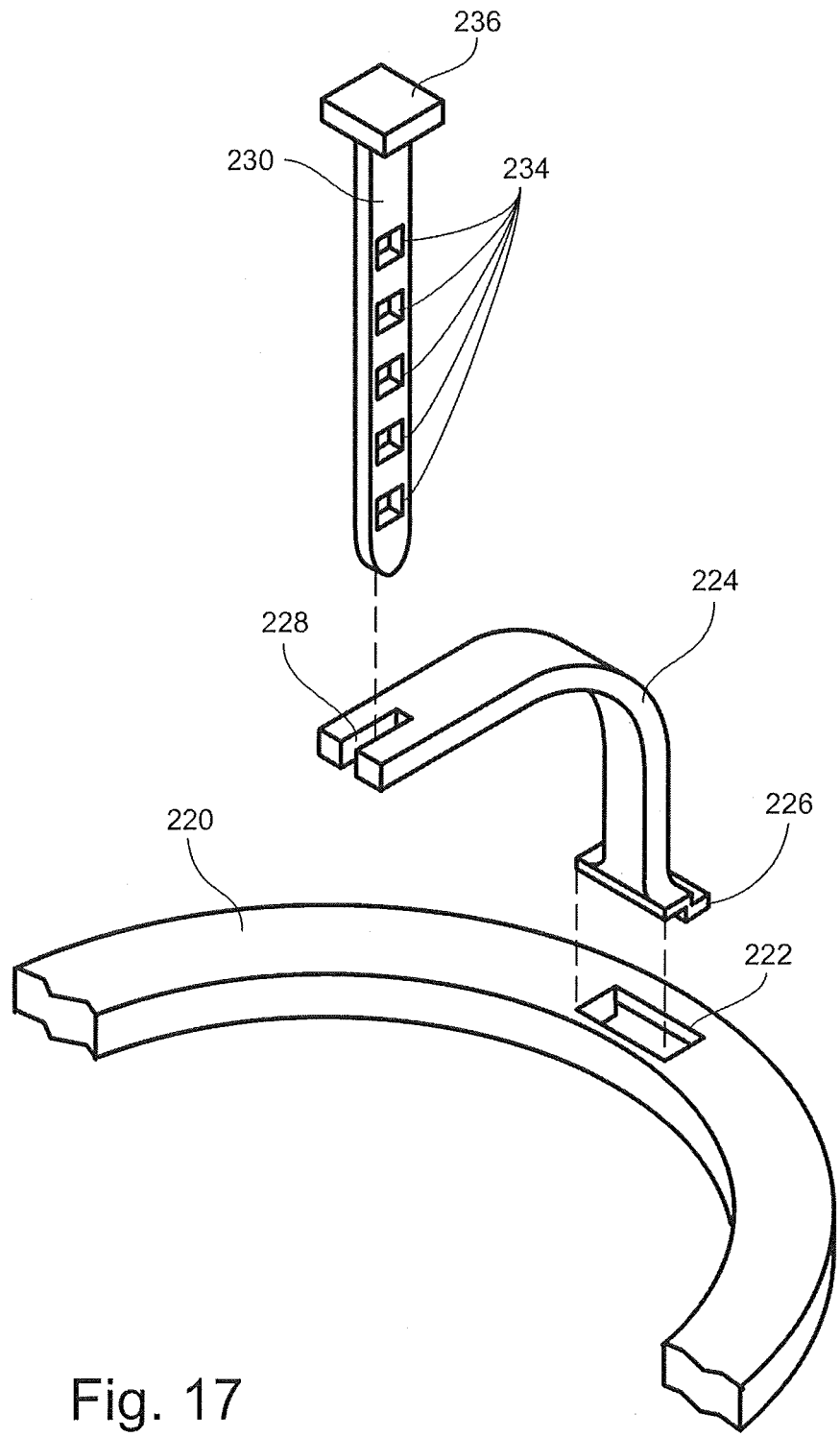
FIG. 17 is an exploded, fragmentary view of a basket support bracket assembly that fits onto the assembly base, shown in a fragmentary view.

Referring now to FIGS. 15-17, further accessories for use with the grill are shown.

An assembly base 170 is provided for fitting on and being supported by the flange 58. See FIG. 1. The assembly base 170 includes a pair of upwardly extending tabs 172, 174 adapted to receive and support a component bar 176 that includes a pair of mating slots 178, 180 for receiving the tabs 172, 174. The component bar 176 also includes an elongate slot 182 extending down its length that can be used to support any desired attachment.

For example, a deflector plate 190 may be inserted into the slot 182. The deflector plate 190 includes two deflector segments 190A, 190B that include downwardly-extending flanges 192A, 192B that extend into the slot 192. The deflector plate 190 also includes a series of crenellations 194 that permit heat and smoke to rise indirectly and along the sides of the grill above the level of the deflector plate 190 into the area where the food is being cooked or smoked.

FIG. 16 illustrates a further embodiment of the invention. An assembly base 200, shown fragmentarily, includes an interior slot 202 that supports the component bar 176. The slot 178 fits into the slot 202 of the assembly base 200 and is retained by the upwardly-extending tab 204 in the slot 202. The other side of the assembly base 200 mirrors the slot 202 and supports the other end of the component bar 176. As also shown in FIG. 16, the component bar 176 can be used to support a divider plate 210 that includes a divider portion 212 that separates the area of the grill 10 below the component bar 200 into two zones. One zone may contain either no combustible material, or the two zones may contain differing amounts of combustible material in order to permit different amounts of heat to rise upwardly in different areas of the grill 10. The divider portion is supported by a support 214 that rests on the top surface of the component bar 176.

As shown in FIG. 17, an assembly base 220 with a slot 222 in its upper side is provided for supporting a bracket 224 that includes a tab 226 that fits into the slot 222. The bracket 224 has a curve that extends radially-inwardly into the central area of the grill 10, and includes a notch 228 in its end that supports a vertically-extending post 230. The post 230 has a series of openings 234 vertically-spaced along its length from which accessories may be suspended. The post is supported in the notch 228 by an enlarged head 236. The other side of the assembly base 220 mirrors the slot 222 and supports the other end of the component bar 176.

Barbeque grill accessories according to the invention have been described with reference to specific embodiments and examples. Various details of the invention may be changed without departing from the scope of the invention. Further-more, the foregoing description of the preferred embodiments of the invention and best mode for practicing the invention are provided for the purpose of illustration only and not for the purpose of limitation, the invention being defined by the claims.

I claim:

1. A barbeque accessory assembly for use with a barbeque grill having an enclosure within which is contained a fire ring positioned over a fire box, with a grill grate positioned in vertically spaced relation above the fire ring, and comprising:
   (a) a component bar receiving bracket for being positioned on the fire box;
   (b) the component bar receiving bracket including a notch for receiving and supporting one end of a component bar thereon and further comprising an arcuate structure having a pair of diverging arms and a centrally-positioned support for receiving and supporting one end of the component bar, wherein first and second component bar receiving brackets are adapted to be positioned on opposite sides of the grill to support the component bar in a position extending across the grill from end side to the other side; and
   (c) the component bar including a longitudinally-extending slot therein for receiving an accessory therein.

2. A barbeque accessory assembly according to claim 1, wherein component bar receiving bracket comprises a circular assembly base for being supported on the fire ring of the grill, and having a pair of opposed support members for supporting the component bar in a position extending across the grill from end side to the other side.

3. A barbeque accessory assembly according to claim 1, wherein the accessory comprises a heat deflector adapted to be inserted in the slot of the component bar and extend downwardly into the fire box.

4. A barbeque accessory assembly according to claim 1, wherein the component bar includes a pair of longitudinally-extending slots therein for receiving first and second accessories therein.

5. A barbeque accessory assembly according to claim 1, wherein the accessory comprises a grill grate segment.

6. A barbeque accessory assembly according to claim 4, wherein the accessory comprises a pair of grill grate segments for being positioned in respective slots of the component bar.

7. A barbeque accessory assembly according to claim 1, and including first and second extensions for supporting the component bar in an elevated position above the component bar receiving bracket.

8. A barbeque accessory assembly according to claim 6, wherein the component bar includes a centrally-positioned hole for receiving and supporting a vertical shaft carrying a grill accessory.

9. A barbeque accessory assembly according to claim 6, wherein the grill accessory is a meat support.

* * * * *